(12) United States Patent
Coudray et al.

(10) Patent No.: US 6,345,532 B1
(45) Date of Patent: *Feb. 12, 2002

(54) METHOD AND DEVICE FOR DETERMINING THE QUANTITY OF PRODUCT PRESENT IN A RESERVOIR, A PRODUCT RESERVOIR AND A DEVICE FOR PROCESSING ELECTRICAL SIGNALS INTENDED FOR SUCH A DETERMINATION DEVICE

(75) Inventors: Pascal Coudray, La Chapelle des Fougeretz; Marie-Hélène Froger, Chateaugiron, both of (FR)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,517

(22) Filed: Jan. 8, 1998

(30) Foreign Application Priority Data

Jan. 31, 1997 (FR) .............................................. 97 01095

(51) Int. Cl.$^7$ ........................... G01F 23/26; B41J 2/195
(52) U.S. Cl. ........................................ 73/304 C; 347/7
(58) Field of Search ........................... 73/304 R, 304 C, 73/290 R, 724, 780; 340/618, 620; 347/7

(56) References Cited

U.S. PATENT DOCUMENTS

| | | | |
|---|---|---|---|
| 4,415,886 A | | 11/1983 | Kyogoku et al. |
| 5,135,485 A | * | 8/1992 | Cohen et al. ................ 324/606 |
| 5,437,184 A | * | 8/1995 | Shillady .................... 73/304 C |
| 5,585,732 A | * | 12/1996 | Steele et al. ............... 73/304 C |
| 5,602,540 A | * | 2/1997 | Spillman, Jr. ............. 73/304 C |
| 5,765,434 A | * | 6/1998 | Harbaugh .................. 73/304 C |
| 5,891,630 A | * | 4/1999 | Eggers et al. |

FOREIGN PATENT DOCUMENTS

| | | |
|---|---|---|
| EP | 0338400 | 10/1989 |
| JP | 01304950 | 12/1989 |
| JP | 02169259 | 6/1990 |
| WO | WO93/06572 | 4/1993 |

\* cited by examiner

*Primary Examiner*—Harshad Patel
(74) *Attorney, Agent, or Firm*—Fitzpatrick, Cella, Harper & Scinto

(57) ABSTRACT

A device determines a quantity of product present in a reservoir, particularly a quantity of ink in the reservoir (112) of an image formation device, such as a printer (10). In a preferred embodiment, the devices includes means (120, 113, 123) of connecting the said product to a predetermined potential, means (121, 122) of establishing a first electrical field through the product, and adapted to establish a second electrical field different from the first electrical field, means (122), of measuring electrical fields in order to produce first and second electrical signals representing electrical fields, and means (100) of processing the first electrical signal in order to produce a signal representing the quantity of product, and adapted to process the second electrical signal in order to detect the interruption of the connection of the product to the predetermined potential, the said interruption corresponding to a predetermined quantity of product present in the reservoir (112).

60 Claims, 8 Drawing Sheets

Figure 1:
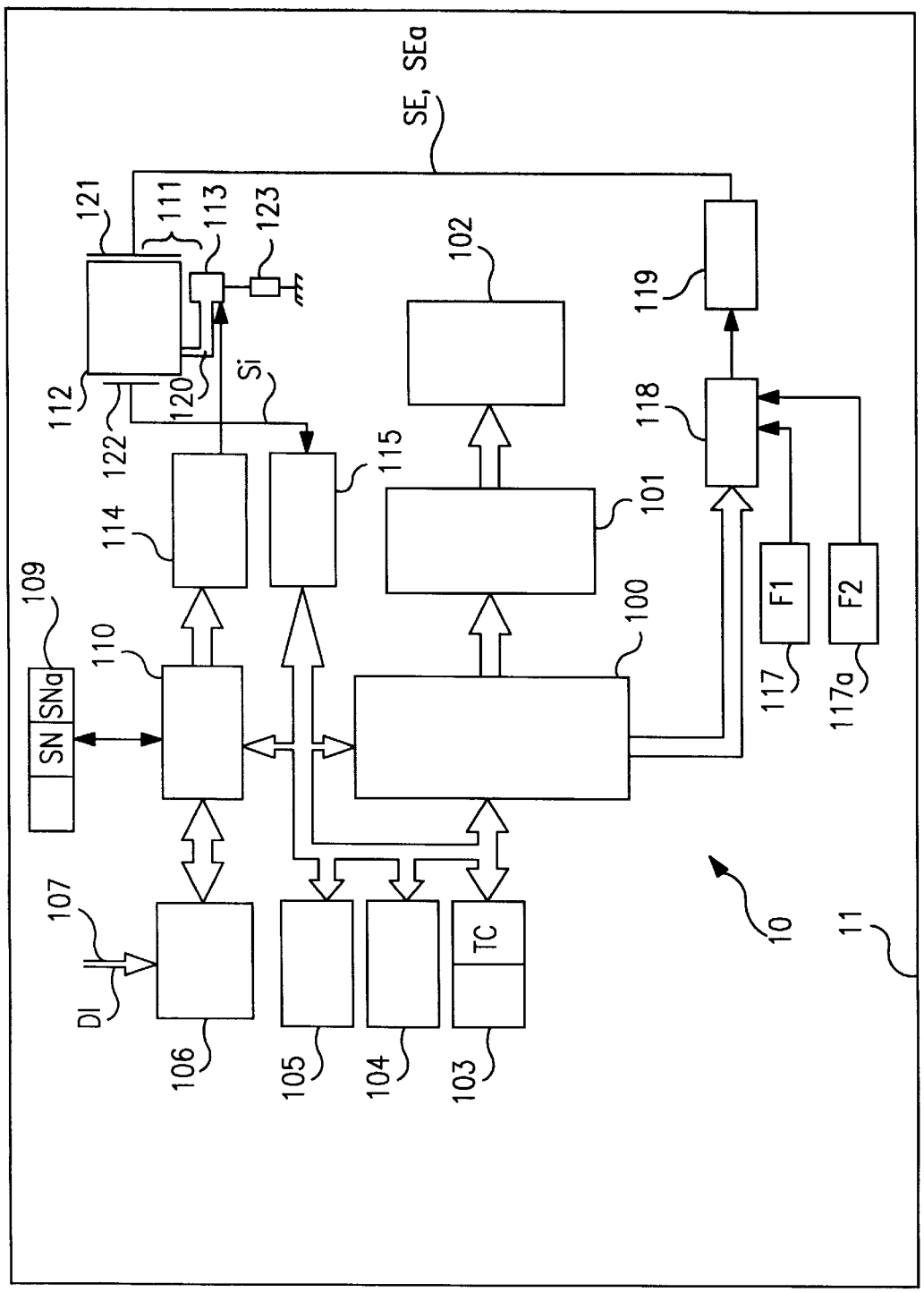

METHOD AND DEVICE FOR DETERMINING THE QUANTITY OF PRODUCT PRESENT IN A RESERVOIR, A PRODUCT RESERVOIR AND A DEVICE FOR PROCESSING ELECTRICAL SIGNALS INTENDED FOR SUCH A DETERMINATION DEVICE

The present invention concerns in general terms a method and device for determining the quantity of product present in a reservoir, and more particularly for determining the quantity of ink present in the reservoir of an image formation device. The present invention also concerns a product reservoir, notably an ink reservoir for an image formation device. It also concerns a device for processing electrical signals intended to be used in a device for determining the quantity of product present in a reservoir.

For image formation devices, such as printers, which use ink jet technology, numerous devices and methods have been designed for determining the quantity of ink present in the reservoir.

The document U.S. Pat. No. 4,700,754 describes a device for detecting the quantity of liquid ink in a flexible reservoir contracting as the ink level decreases. The external bottom wall is coated with a conductive layer constituting one pole of a capacitor. The wall of the reservoir serves as a dielectric of the capacitor thus produced whilst the ink surface in contact with the bottom wall constitutes the second pole of the capacitor. A measuring electrode placed at the centre of the reservoir connects the ink to a measuring device. When the ink level decreases, the surface area of ink facing the conductive layer coated on the wall decreases, and therefore the value of the equivalent capacitance also decreases. The fact that the reservoir is flexible enables the measuring electrode to remain in contact with the ink.

This type of detection is used for a cartridge having flexible walls and cannot be applied to rigid cartridges. This is because contact between the measuring circuit and the ink can be made only if the top wall, when it is crushed, forces the measuring electrode to be in contact with the ink.

In addition, it is necessary to provide an electrode in contact with the ink in the reservoir, which complicates the manufacture of the reservoir and increases the cost thereof.

Moreover, it is difficult to know the ink level if the latter is below a level lying between the measuring electrode and the bottom wall. This is because the measuring electrode cannot go down as far as the base of the reservoir. The measurement range is thus limited in the lower values. However, it is precisely when there is very little ink remaining in the reservoir that it is advantageous to be alerted so as to change the reservoir or fill it.

The document EP-A-0 028 399 describes a device for detecting a minimum quantity of ink in a reservoir. A resonant circuit includes a resistor and a capacitor whose poles are formed by two metal plates between which the ink reservoir is situated. The reservoir containing the ink forms the dielectric of the capacitor. As the quantity of ink decreases, the value of the capacitance of the capacitor thus formed varies.

The resonant circuit is calibrated so that its resonant frequency corresponds to a predetermined quantity of ink in the reservoir. The maximum voltage at the terminals of the resistor is thus achieved for this predetermined quantity of ink which constitutes a threshold.

By measuring the voltage at the terminals of the resistor of the resonant circuit, the passing of the threshold is detected, and a warning signal is activated.

According to this document, only the passing of a threshold is measurable, and consequently only a quantity of ink can be detected. Under these circumstances, this device is of interest if the quantity of ink detected is small, in order to alert the user just before the end of the reservoir.

However, it is very difficult with this device to determine accurately what voltage corresponds exactly to a small quantity of ink. It is then necessary to provide a safety margin in order to alert the user before the reservoir is empty. This safety margin, for example around 20 per cent of the total quantity of ink, results in a waste of ink, since the user will change the reservoir whilst there is still ink inside.

The present invention aims to remedy the drawbacks of the prior art by providing a device and method for determining the quantity of product present in a reservoir, which detects, with satisfactory reliability and with precision, a predetermined quantity of product, whilst being simple and economical to implement.

The invention starts from the idea according to which generating an electrical field in the reservoir produces a signal representing the quantity of product in the reservoir. However, the inventors have found that this signal can be used only in a limited range of quantities.

This is because, with certain types of alternating electrical fields characterised by a frequency of around 0.5 to 2 MHz, the representation of the quantity of product as a function of the signal is biunivocal within a product quantity range; the signal can therefore be used directly in this range in order to determine the quantity of product. However, the representation of the quantity of product as a function of the signal is not biunivocal outside this range; outside this range, there is therefore uncertainty about the quantity of product.

The inventors then discovered that, by increasing the frequency, the representation was biunivocal for all the quantity values (from 0 to 100%). However, for certain types of reservoir the inventors once again found a scatter in the electrical characteristics of the reservoirs from one example to another, thereby giving rise to uncertainty about the quantity outside a range in which the signal is usable.

In this context, the invention proposes a method for determining the quantity of product present in a reservoir, characterised in that it includes the steps of:

establishing, through the product present in the reservoir, a first electrical field, and a second electrical field which is differentiated from the first electrical field by at least one characteristic, measuring the said first and second electrical fields passing through the product, in order to produce first and second electrical signals respectively representing the first and second electrical fields, and processing the first electrical signal in order to produce a first information signal able to take a plurality of values representing the quantity of product then present in the reservoir, taking into account, in order to determine the quantity of product, at least one range of quantities in which this representation is directly usable, and processing the second electrical signal in order to produce, at the appropriate time, a second information signal representing at least one predetermined quantity outside the said range.

The present invention resolves the above-mentioned problems and makes it possible to obtain a usable measurement of the quantity of product in a reservoir over all the quantity values (from 0 to 100%).

In particular, providing a second electrical field differentiated by at least one characteristic from the first, advantageously removes the uncertainties mentioned above outside the range in which the first information signal is directly usable, whether these uncertainties are due to the fact that the representation is not biunivocal outside this range, or whether they are due to the scatter in electrical behaviour observed from one reservoir to another.

In general terms, the invention applies to any product, notably a consumable product used in a given device.

The invention preferably applies to ink contained in the reservoir of an image formation device. "Ink" here means any liquid, solid, gaseous or powder product designed to modify an optical or physical factor of the printing medium.

The present invention also has the advantage of being adaptable to a large number of existing devices.

The invention applies to cases where several interchangeable reservoirs can be used in succession. This occurs for example for image formation devices in which ink reservoirs of different colours can be used successively. The user fits the reservoir of the desired colour at a given moment and makes as many changes of reservoir as necessary.

In fact, the measurement performed by virtue of the invention requires no storage in memory of successive measurements, and only the measurements performed instantaneously are useful for determining the quantity of product present in the reservoir and for detecting the predetermined quantity of product present in the reservoir.

In a preferred embodiment, the product is connected to a predetermined potential and the second electrical signal is processed in order to produce, at the appropriate time, an information signal corresponding to the interruption of the connection of the product to the predetermined potential, the said interruption itself corresponding to a predetermined quantity outside the said range.

This characteristic is particularly advantageous since the second signal is processed in order to detect only the interruption of the connection of the product to a potential, which is not only easy to implement but is also particularly reliable because of the simplicity of the criterion used.

According to another characteristic which is simple to implement in this embodiment, the step of processing the second electrical signal includes the comparison of the second electrical signal with a second threshold in order to detect the interruption of the connection of the product to the predetermined potential.

According to another characteristic of the invention which is also easy to implement, the step of processing the first electrical signal includes the detection of the amplitude of the first electrical signal and the production of the signal representing the quantity of product from a value given by a calibration table as a function of the amplitude detected.

According to yet another preferred characteristic of the invention, the method includes the comparison of the first electrical signal with a first threshold in order to determine whether the quantity of product present in the reservoir is situated in the said range, or whether the second electrical field must be established through the product present in the reservoir.

This comparison makes it possible to distinguish whether the quantity of product present in the reservoir is close to the predetermined quantity, and it is then only in such case that the second electrical field is applied in order to find out whether the predetermined quantity has been reached. Thus it is not necessary to apply the second electrical field to the product if, according to the first electrical signal, the quantity of product present in the reservoir is not close to the predetermined quantity.

Advantageously, the method also includes the step of displaying a representation of the quantity of product present in the reservoir and of the predetermined quantity of product present in the reservoir, or the step of transmitting the signal representing the quantity of product present in the reservoir, or the predetermined quantity of product present in the reservoir, to a remote device so that it will display a representation of the quantity of product present in the reservoir.

This product being a consumable product used in a given device, the user knows at any time the quantity of product remaining in the reservoir.

The user is alerted to the fact that the predetermined quantity has been reached. For example, if this quantity is zero or almost zero, he can fill the reservoir or replace it with a full reservoir.

According to another aspect, the invention concerns a device for determining a quantity of product present in a reservoir, characterised in general terms in that it has:

means of establishing first and second electrical fields through the product present in the reservoir, the second field being differentiated from the first by at least one characteristic, means of measuring the first and second electrical fields in order to produce first and second electrical signals respectively representing the said first and second electrical fields, and means of processing the first electrical signal so as:

to produce a first information signal able to take a plurality of values representing the quantity of product then present in the reservoir, to take into account, in order to determine the quantity of product, at least one range of quantities in which this representation is directly usable, to produce, at the appropriate time, from the first electrical signal, a second information signal representing at least one predetermined quantity outside the said range.

The device according to the invention is particularly well suited to implementing the method briefly disclosed above. This device also has analogous advantageous.

In a preferred embodiment, the device also has means of connecting the product to a predetermined potential, whilst the processing means are adapted to produce, at the appropriate time, from the second electrical signal, an information signal corresponding to the interruption of the connection of the product to the predetermined potential, this interruption itself corresponding to a predetermined quantity outside the said range.

This device has advantages similar to those of the preferred implementation of the method according to the invention set out above.

According to a preferred characteristic of the invention, the establishment means include first and second metallic elements disposed outside the reservoir. The first and second metallic elements form the poles of a capacitor, whose dielectric is formed by the reservoir containing the product.

According to preferred characteristics, the establishment means are fed by oscillators selectively connected to the establishment means via a selector, and the first and second electrical fields are produced by alternating signals, for example with frequencies substantially equal to 1 MHz and 10 khz respectively.

The inventors have determined that these frequencies optimise the determination of the quantity of product and the determination of the predetermined quantity of product.

The difference in characteristics between the electrical fields is due to the difference in frequency of the signals used to produce the electrical fields.

According to a preferred embodiment which is simple and economical to implement, the measuring means include an envelope detector and an analogue to digital converter for producing a digital signal representing the amplitude of the first or second electrical signal.

According to preferred characteristics, the device also includes a means of displaying a representation of the quantity of product present in the reservoir.

It also includes a means of displaying a representation of the predetermined quantity of product present in the reservoir.

The user is thus effectively informed about the quantity of product present in the reservoir.

In another aspect, the invention proposes a product reservoir, characterised in that it has connection means designed to connect the product to a predetermined potential, with a view to detecting the interruption of the connection of the product to the predetermined potential, the said interruption corresponding to at least a predetermined quantity of product present in the reservoir.

In the case of an image formation device, the connection means are advantageously included in the ink ejection means. The connection means are thus common with the ink ejection means, and the connection of the product to the predetermined potential then requires no additional element to be included in the reservoir, nor consequently any additional manufacturing step, which is particularly economical.

The reservoir according to the invention is particularly suited to equipping the above device and makes it possible to obtain advantages analogous to those disclosed above.

The invention also concerns a cartridge including this ink reservoir.

The present invention also concerns a processing device including the means of processing the first and second electrical signals means as briefly defined above.

Figure 2:
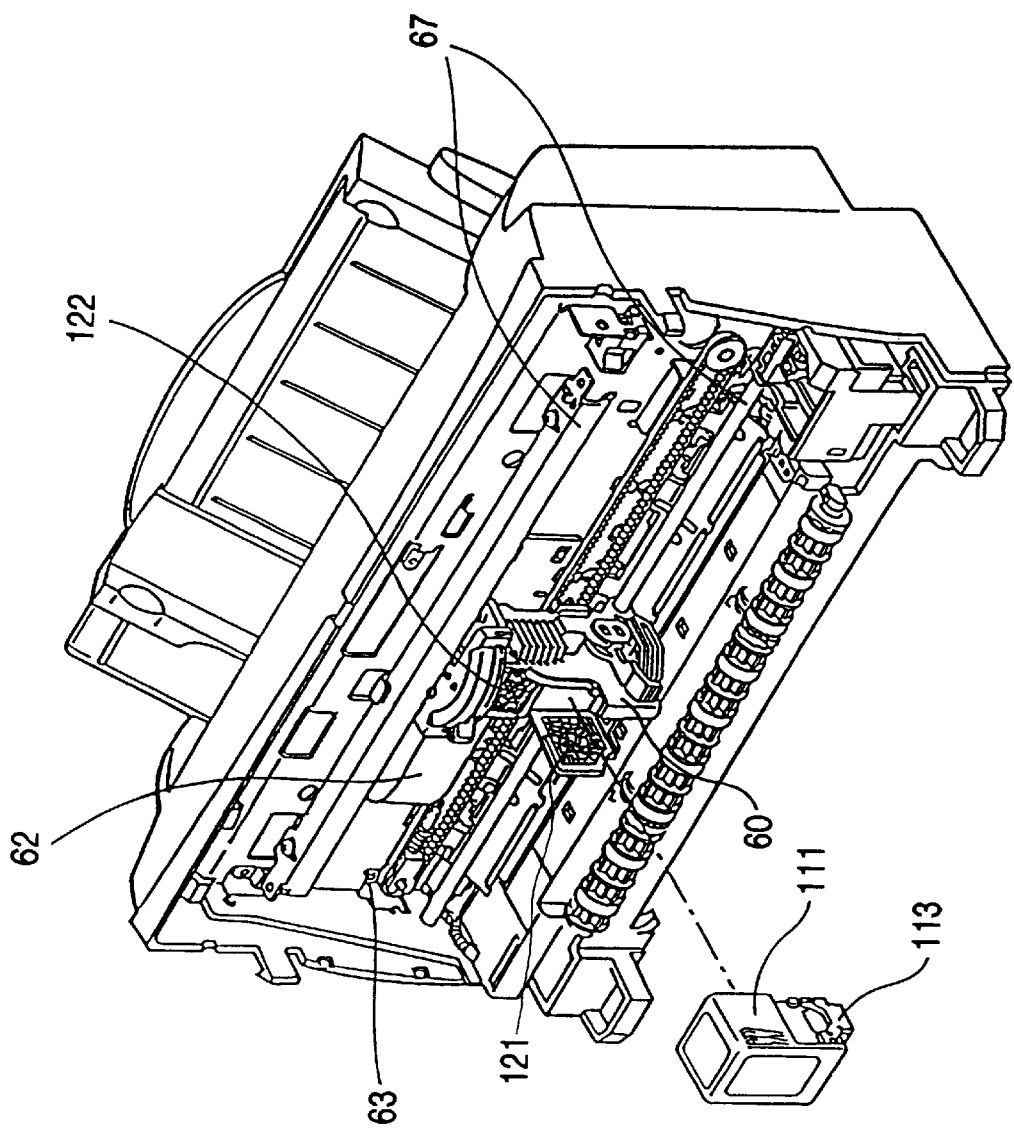
Figure 3:
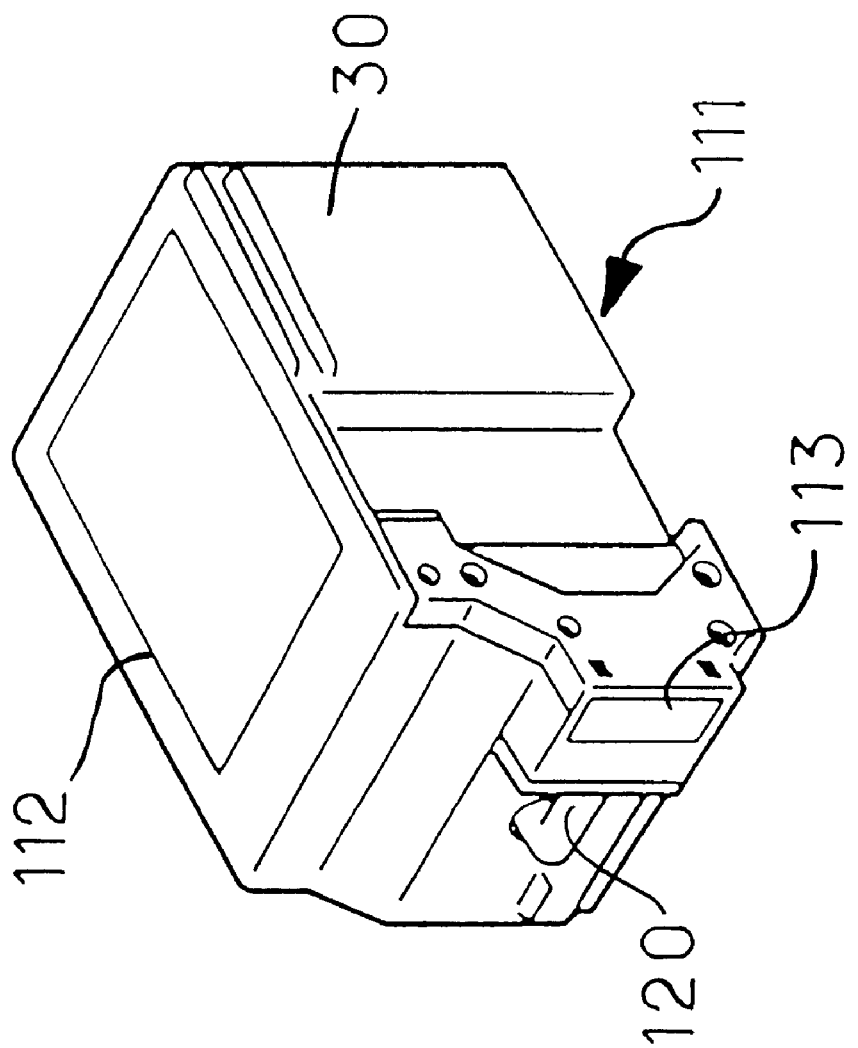
Figure 4:
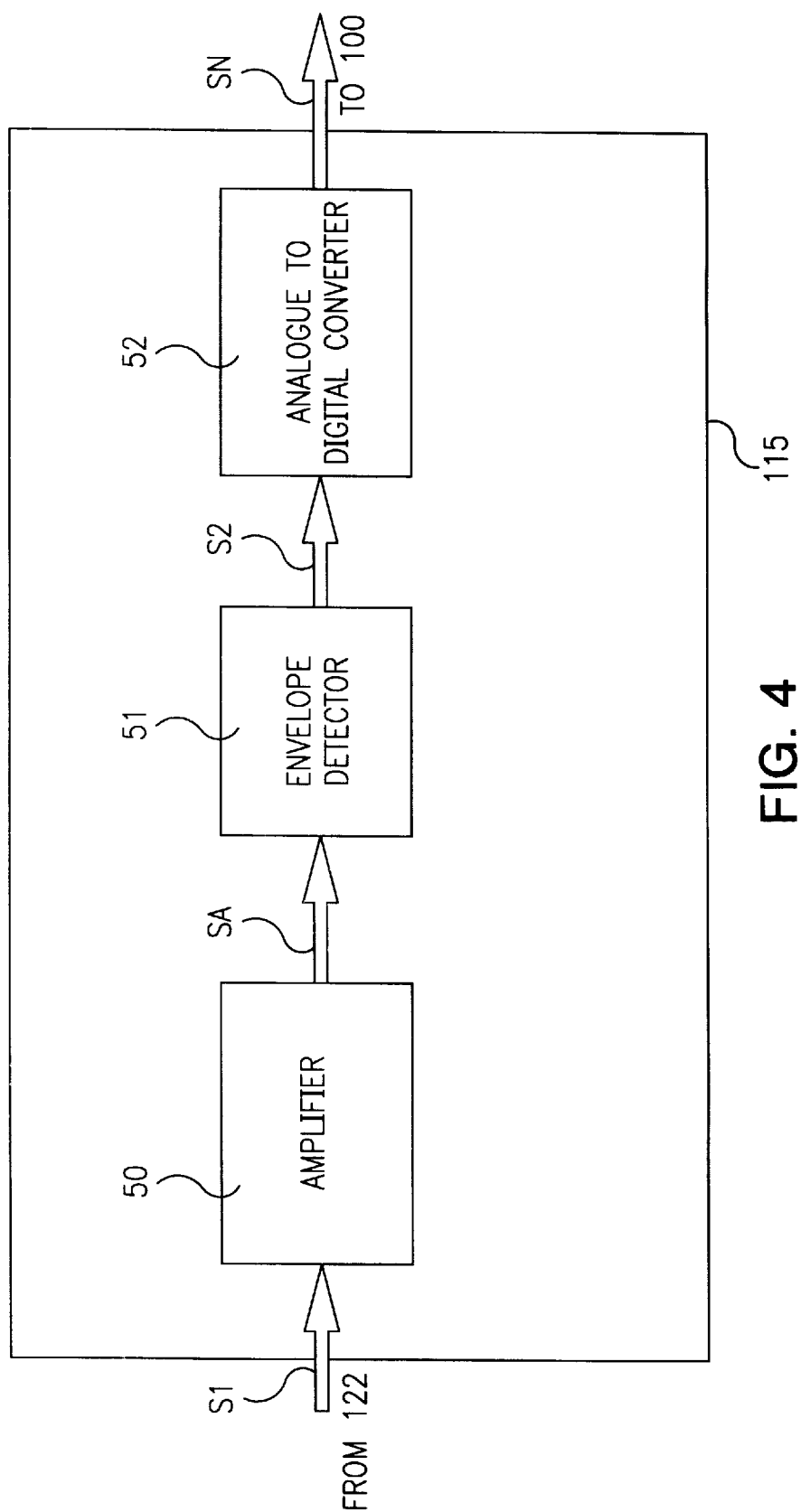
Figure 5:
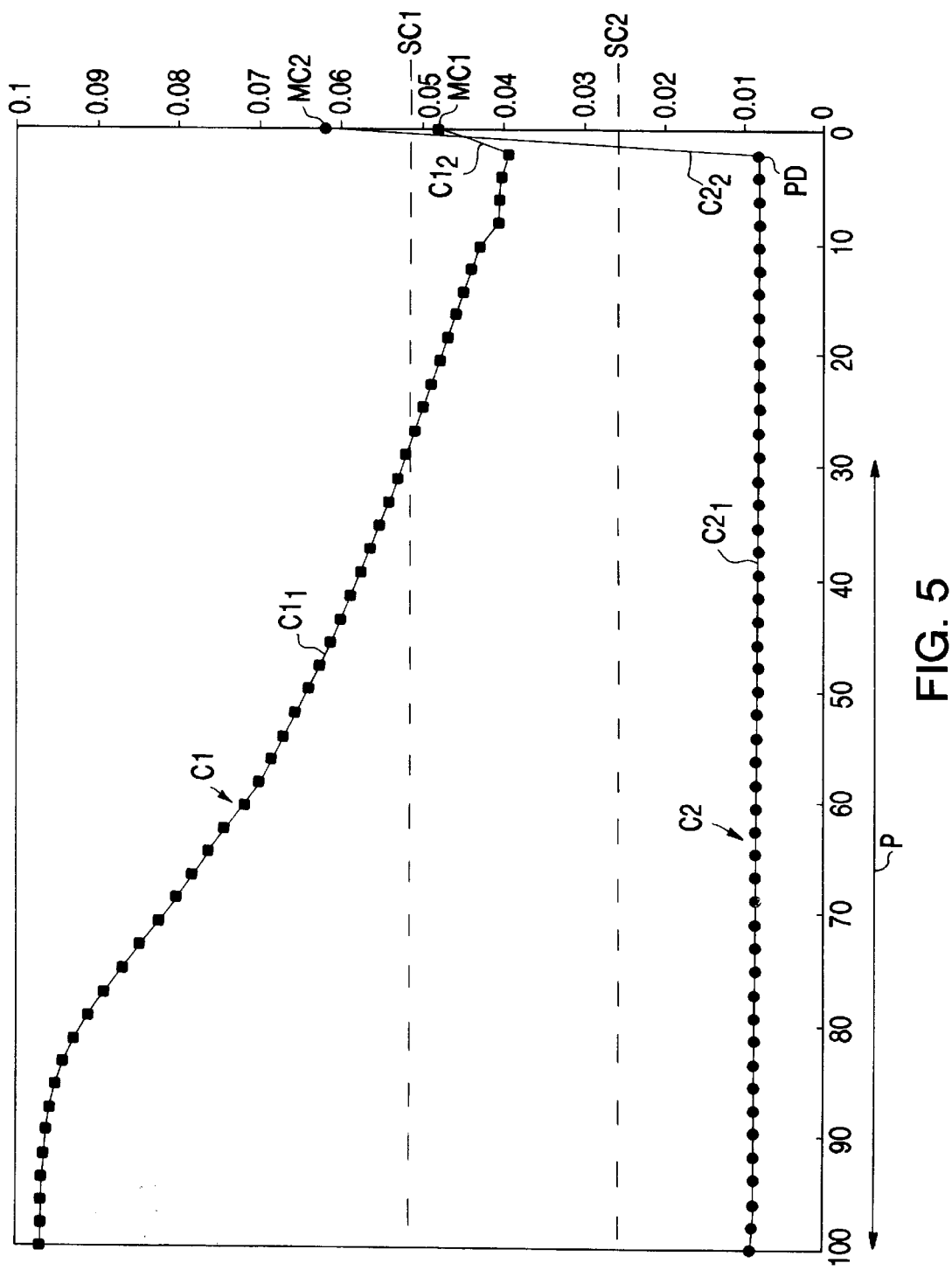
Figure 5A:
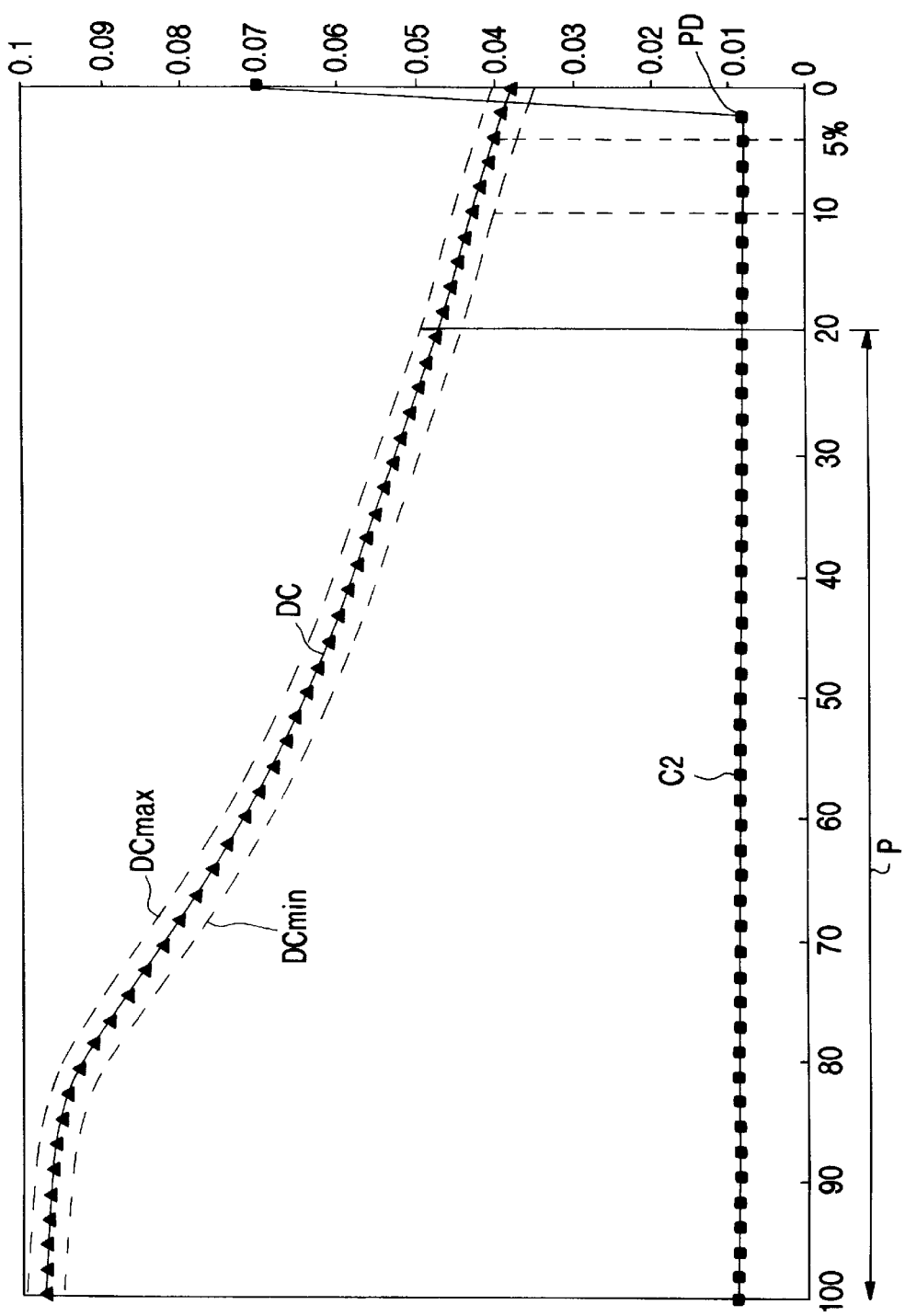
Figure 6:
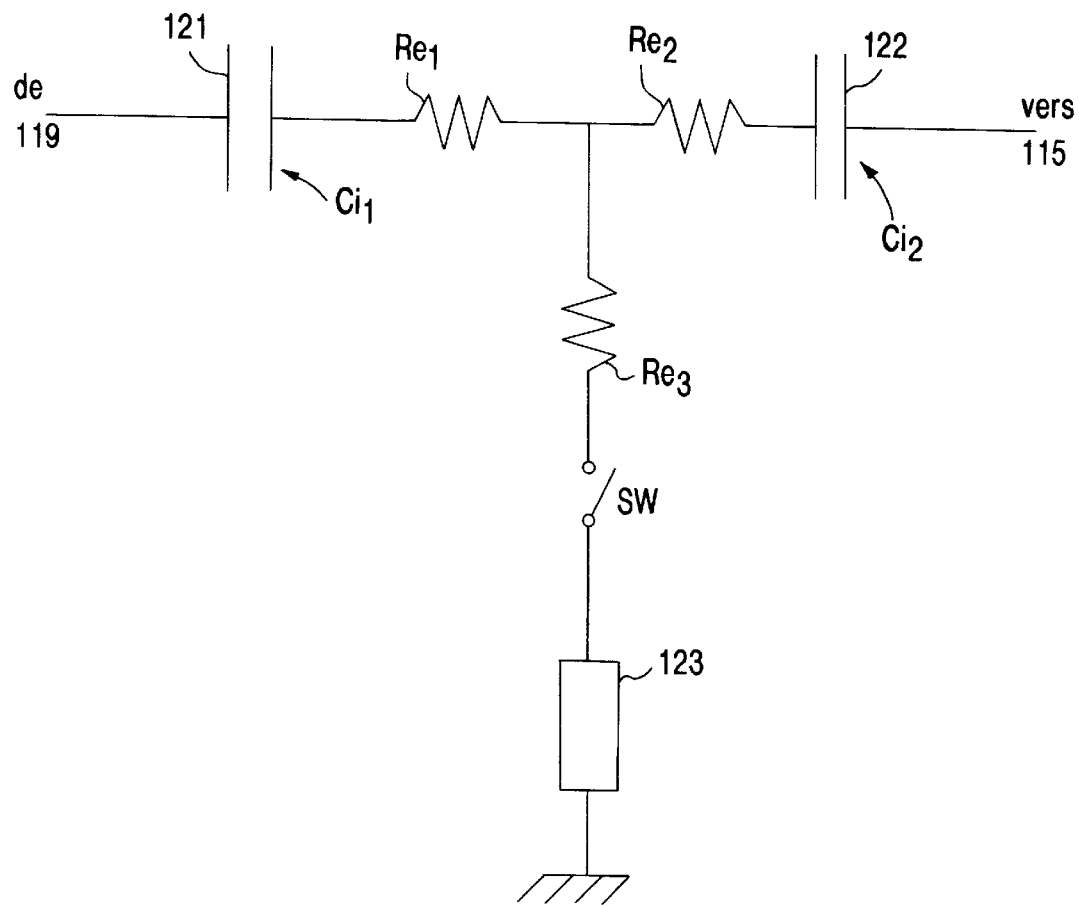
Figure 7:
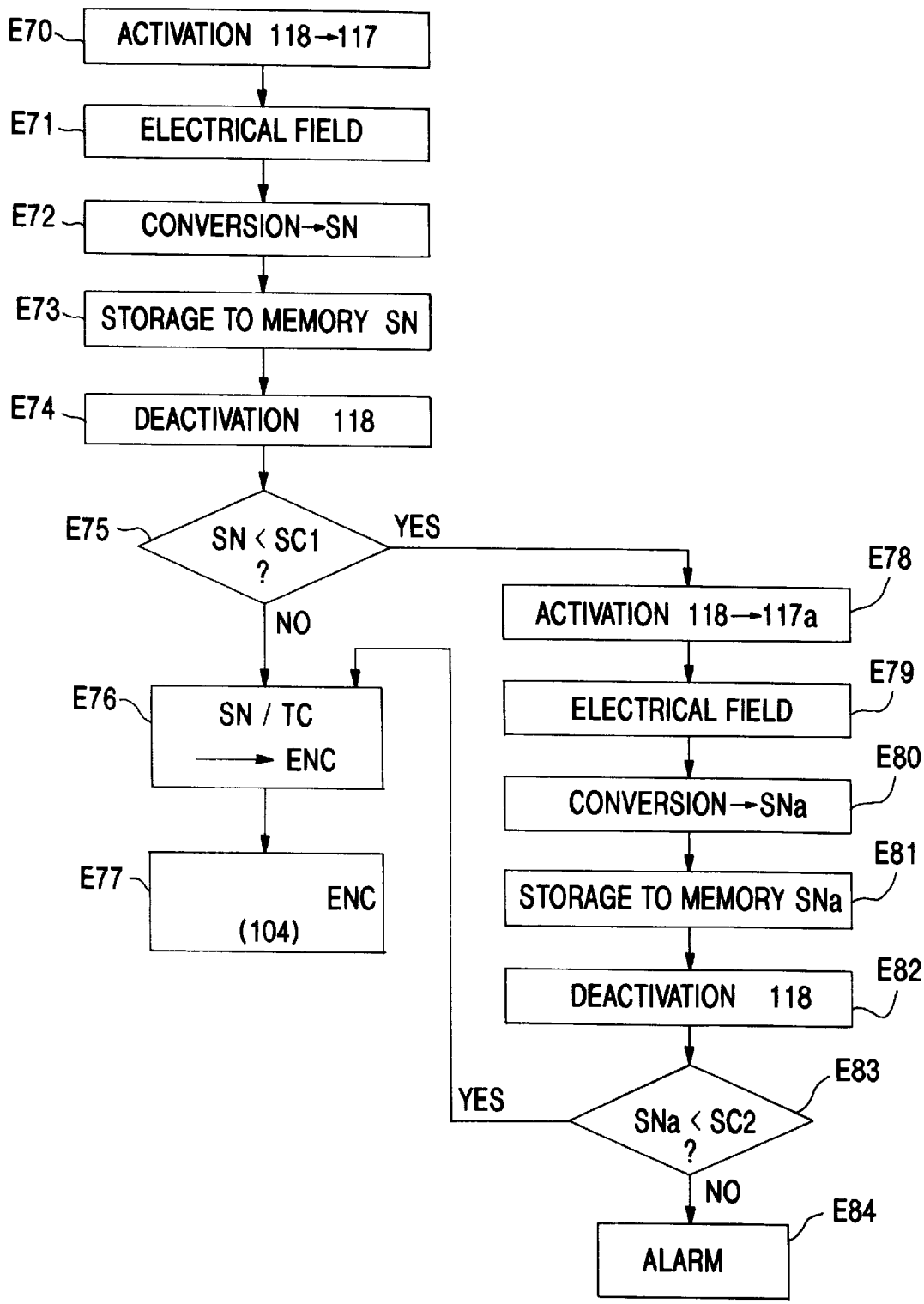

The characteristics and advantages of the present invention will emerge more clearly from a reading of several embodiments illustrated by the accompanying drawings, in which:

FIG. 1 is a block diagram of a first embodiment of an image formation device according to the invention, FIG. 2 is a simplified perspective view of a part of the image formation device according to the invention, FIG. 3 is a simplified diagrammatic view of an ink reservoir included in the device in FIG. 1, FIG. 4 is a block diagram of a conversion circuit according to the invention, included in the device in FIG. 1, FIG. 5 is an experimental curve representing measurements made by virtue of the invention, FIG. 5a is an experimental curve representing measurements made by virtue of the invention, FIG. 6 is an equivalent electrical diagram of the ink reservoir included in the device in FIG. 1, FIG. 7 is an ink quantity determination algorithm according to the invention, According to the first embodiment chosen and depicted in FIG. 1, the invention applies to an image formation device 10 generally included in an image or data processing device 11. The following description refers particularly to an ink jet printer, but the image or data processing device 11 may also for example be a laser printer, or be included in a facsimile machine, or a microcomputer. The components other than those of the image formation device 10 are well known to persons skilled in the art and consequently are neither depicted nor described.

The image formation device 10 receives data to be printed DI by means of a parallel input/output port 107 connected to an interface circuit 106. The circuit 106 is connected to an ink ejection control circuit 110, which controls an ink cartridge 111, via an amplification circuit 114.

The ink cartridge 111 is exchangeable and is mounted on a reciprocating carriage actuated by a motor 102. The ink cartridge 111 includes essentially an ink reservoir 112 and a print head 113 connected to each other by a pipe 120.

The pipe 120 and the print head 113 contain ink coming from the reservoir 112.

The printer also has a principal data processing circuit 100, associated with a read-only memory 103 and a random access memory 109. The read-only memory 103 contains the operating programs of the principal processing circuit 100, whilst the random access memory 109, also associated with the ink ejection control circuit 110, temporarily stores the data DI received by means of the interface 106 and the data processed by the principal processing circuit 100.

The principal processing circuit 100 is connected to a display 104, on which the principal processing circuit 100 controls the display of messages representing the operation of the printer. The principal processing circuit 100 is connected to a keyboard 105, having at least one switch, by means of which the user can transmit operating commands to the printer.

The principal processing circuit 100 is also connected to the motor 102 by means of an amplification circuit 101. The motor 102 moves the carriage which carries the printing cartridge 111. The motor 102 is for example a stepping motor.

The printer described above is conventional and well known to persons skilled in the art. It will therefore not be detailed any further.

According to the invention, in general terms at least two electrical fields are generated through the ink which are differentiated by at least one characteristic, and these electrical fields are analysed in order to determine the quantity of ink in the reservoir.

Thus, according to the invention, the printer has in general terms:

means 121 and 122 for establishing first and second electrical fields through the product in the reservoir, the second field being differentiated from the first by at least one characteristic, means 115 for measuring the said first and second electrical fields in order to produce first and second electrical signals respectively representing the said first and second electrical fields, and means 100 of processing the first and second electrical signals. The function of these means is first of all to produce a first information signal able to take a plurality of values representing the quantity of product then present in the reservoir. They make it possible to take into account, for determining the quantity of product, at least one range P of quantities in which this representation is directly usable. They also have the function of producing, at the appropriate time, from the second electrical signal, a second information signal representing at least a predetermined quantity outside the said range P.

In the preferred embodiment described here, the product is connected to a predetermined potential and then at least two electrical fields are generated through the product in the reservoir which are differentiated by at least one characteristic, and these electrical fields are analysed in order to determine the quantity of ink present in the reservoir and to detect a predetermined quantity of ink.

In this regard, the printer here has means 120, 113 and 123 of connecting the said product to a predetermined potential.

More particularly, the connection means are here the channel 120, the ejection head 113 and the impedance 123. The connection means are therefore here common to the means required for ejecting ink. The ink contained in the print head 113, and consequently the ink contained in the pipe 120 and reservoir 112, is thus connected to the predetermined potential by means of an impedance 123, which consists overall of the impedance of the ink ejection circuit.

The predetermined potential is here earth and the predetermined quantity is a zero quantity of ink.

The means of establishing an electrical field are here first and second metallic elements 121 and 122 fixed to the carriage moving the cartridge, as will be seen subsequently. As a variant, the first and second metallic elements are fixed to the outside of the walls of the ink cartridge 111. The elements 121 and 122 constitute the poles of a capacitor whose dielectric is formed by the reservoir containing the ink.

The inventors have observed that the electrical characteristics of the dielectric formed by the reservoir containing the ink are variable according to the quantity of ink.

The first electrical field is produced by the application of a predetermined alternating excitation signal SE supplied by an oscillator 117 via a selector 118 and an amplifier 119. The excitation signal is sinusoidal, or as a variant is a square signal, with a frequency F1 substantially equal to 1 MHz.

The second electrical field is produced by a second oscillator 117a connected to the selector 118, in order to supply a second alternating excitation signal SEa, with a frequency F2 substantially equal to 10 kHz.

The difference in characteristics between the electrical field is therefore, in this embodiment, caused by the difference between the frequencies of the signals SE and SEa. In other embodiments, the electrical fields could be differentiated by other characteristics such as voltage, signal shape, etc. The first electrical field could be generate by an alternating signal, whilst the second electrical field could be generated by a continuous signal. The two electrical fields could also be generated by two continuous signals of different voltages.

The principal processing circuit 100 is connected to the selector 118 in order to control it and thus enable the transmission of the alternating signal between the oscillator 117 or the oscillator 117a and the element 121 constituting a pole of the capacitor.

The metallic element 122 is connected to a conversion circuit 115 having an input impedance of 1 megohm, itself connected to the principal processing circuit 100. When the oscillator 117 or 117a supplies the metallic element 121 with the signal SE or SEa, an electrical field exists between the elements 121 and 122. In response to the electrical field, the amplitude of the electrical signal S1 at the input of the conversion circuit 115 varies; the conversion circuit 115 in response supplies a digital signal SN or SNa to the principal processing circuit 100.

As a variant, the principal processing circuit is replaced with software used in a microcomputer, notably if the image formation device 10 is included in this microcomputer.

With reference to FIG. 2, the printing device conventionally includes a carriage 60 for carrying the printing cartridge 111. The carriage is driven in a reciprocating movement on a movement path formed by guide rails 67. The motor 102 drives the carriage 60 by means of a belt device 63. The path of movement of the print head 113 is parallel to a line on a printing medium, not shown, such as a sheet of paper.

The carriage 60 carries the metallic elements 121 and 122, situated in the vicinity of the location designed to receive the cartridge 111.

A flexible cable 62 connects the amplification circuit 114 to the ink cartridge 111. The cable 62 also connects the amplifier 119 to the metallic element 121, and the metallic element 122 to the detection circuit 115.

With reference to FIG. 3, the printing cartridge 111 includes the ink reservoir 112 which has a plastic envelope 30, which is for example filled with a spongy body soaked with ink.

The connecting pipe 120 connects the reservoir 112 to the print head 113.

According to FIG. 4, the conversion circuit extracts the amplitude of the signal received by the metallic element 122 in response to the excitation signal SE or SEa. The conversion circuit 115 includes an amplifier 50 with an input impedance of 1 megohm connected to an envelope detector 51 used to determine the amplitude of the analogue signal which is supplied to it as an input. The envelope detector 51 is connected to an analogue to digital converter 52, an output of which is connected to the processing circuit 100.

The metallic element 122 supplies the electrical signal S1 or S1a to the amplifier 50, which amplifies the electrical signal S1 or S1a in current and voltage so as to facilitate subsequent processing. The electrical signal S1 or S1a is a function of the capacitance existing between the two metallic elements 121 and 122 at the time of measurement.

The amplifier 50 supplies the amplified signal SA or SAa to the envelope detector 51, which determines the amplitude of the amplified signal.

The signal S2 or S2a at the output of the envelope detector 51 is supplied to the converter 52. The converter 52 converts the analogue signal S2 or S2a into the digital signal SN or SNa in order to transmit it to the processing circuit 100. A calibration table or mapping table TC stored in memory 103 respectively maps ink quantity values, for example expressed as a percentage of a maximum quantity, to the amplitudes of the digital signal SN supplied by the converter 52.

FIG. 5 is an experimental curve showing the results obtained with the invention. The quantity of ink ENC contained in the reservoir 112, expressed as a percentage of the maximum quantity, is on the X axis, and the value of the electrical signal SN, expressed in volts, supplied by the circuit 115, is on the Y axis.

The curve C1 represents the results obtained with the excitation signal SE having a frequency of around 1 MHz.

As the quantity of ink decreases in the reservoir 112, the measured value of the signal SN decreases. When the ink disappears in the pipe 120, that is to say when the quantity of ink ENC is close to zero, the measured value of the signal SN increases abruptly.

The curve C1 thus has two parts. The first part $C1_1$ of the curve corresponds to the fall in the signal SN, for ink quantity values ENC lying between 100 percent and approximately 2 percent.

The part SC1 comprises a range of values of ink quantities in which the representation is biunivocal and consequently directly usable in order to determine the quantity of ink in the reservoir. This range is indicated at P on FIG. 5 and extends here between the values 100% and 28%.

The second part $C1_2$ of the curve is the rise of the signal SN up to a maximum value MC1, for ink quantity values lying between approximately 2% and 0%.

It will be observed that, outside the range P (that is to say between the values 0% and 28% in the example in FIG. 5) the curve C1 is not a biunivocal representation, that is to say two ink quantities values correspond for a value of the signal SN. It is therefore an uncertainty range.

According to the invention, this uncertainty is removed by the implementation of the second electrical field, which is differentiated from the first by at least one characteristic, in this case its frequency, which is appreciably lower since it is 10 kHz.

The curve C2 represents the results obtained by using the excitation signal SEa having this frequency of 10 kHz. The curve C2 has two parts. In the first part $C2_1$ corresponding to ink quantity values lying between 100% and approximately 2%, the signal SN is substantially constant. The second part $C2_2$ of the curve is a rise of the signal SN from a detection point PD and as far as a maximum value MC2, for ink quantity values lying between approximately 2% and 0%.

A first threshold SC1 is associated with the curve C1. The threshold SC1 is chosen so as to be situated above the second part $C1_2$ for the curve C1, that is to say above the maximum value MC1, whilst separating the first part $C1_1$ into two portions.

A second threshold SC2 is associated with the curve C2. The threshold SC2 is chosen so as to be below the maximum value MC2 of the second part $C2_2$ of the curve C2, whilst being higher than the values of the first part $C2_1$ of the curve C2.

It will thus be observed that the second electrical signal is processed so that, at the appropriate time, that is to say when the printing potential is zero as a result of a quantity of ink in the reservoir corresponding to a predetermined minimum quantity, an information signal representing this quantity of ink is produced. It will be observed that, according to the invention, this quantity of ink is situated outside the range P since it is here 2%.

The embodiment which has just been described with reference to FIG. 5 thus includes a processing of the first electrical signal in order to produce an information signal including a representation of the quantity of product present in the reservoir, this representation being biunivocal in the range P and not biunivocal outside this range. The second signal is used to remove this uncertainty and to detect the minimum quantity of ink outside the range P (2% in this case). The algorithm in FIG. 7 shows the use of the second signal in order to remove the uncertainty when passing below the threshold SC1.

A description will now be given, with reference to FIG. 5a, of another embodiment of the present invention, where the uncertainty arises in another fashion, this uncertainty being removed by virtue of the present invention.

In this embodiment, the first generator 117 in FIG. 1 operates at a frequency of 5 MHz, whilst the second generator 117a operates at a frequency of 10 kHz.

As a result the measurement curve for the quantities of ink present in the reservoir with respect to the signal SN has the trend illustrated under the reference DC in FIG. 5a. However, the inventors have found that measurements made at such frequencies lack precision and are liable to vary from one reservoir to another, even though these reservoirs are apparently identical. As a result the curve DC can take the positions $DC_{max}$ and $DC_{min}$ illustrated in dotted lines.

On the other hand, the curves DC do not have a rising part, in the area of the minimum values of ink quantities, similar to the portion $C1_2$ described above with reference to FIG. 5. In other words, the representations DC, $DC_{max}$ and $DC_{min}$ are biunivocal over the entire range of ink quantity values.

It is clear however that, at low ink quantity values, a significant error appears. This is because, depending on whether the curve $DC_{max}$ is used at the 0% abscissa, or the curve $DC_{min}$, in one case the reservoir is empty and in the other case there still remains 10% of ink.

This error is considered to be unacceptable and the present invention enables it to be avoided, by detecting the moment when the ink arrives at a predetermined minimum threshold, in this case 2%, by using the electrical field operating at a frequency of 10 kHz. This is because the measurement curve for the quantities of ink remains that described with respect to FIG. 5 under the reference C2, with the detection point PD described above.

Thus, in this embodiment, in accordance with the invention the first electrical signal is processed in order to produce a first information signal having a representation DC of the quantity of product present in the reservoir, this representation being directly usable in a range P, which in this case extends from 100% to 20%, the threshold of 20% corresponding, in this embodiment, to the threshold beyond which the curves DC are no longer usable for obtaining a reliable result. The second signal is processed in order to produce at the appropriate time, that is to say when the point PD is reached, a second information signal representing at least one predetermined quantity outside the range P, in this case the quantity of 2%.

According to the embodiments described with respect to FIGS. 5 and 5a, the detection of the predetermined quantity is particularly simple, since it is based on a detection of the interruption of the connection of the products to the predetermined potential (detection point PD).

However, the connection of the product to a potential such as that of earth is not always necessary, in particular if it is clear that the reaction of the reservoir, when it is almost empty, is very different depending on whether it is subjected to an electrical field or to another with different characteristics.

In this regard, the important thing is that the present invention makes it possible to remove, by virtue of the differences in characteristics between the first and second electrical fields, the uncertainty which may exist outside a range in which the first signal (curve C1) is directly usable.

FIG. 6 is an electrical diagram representing the electrical behaviour of the ink reservoir 112 during an ink quantity measurement carried out according to the invention.

Starting from the metallic element 121, the reservoir 112 is equivalent to a first capacitor $Ci_1$ representing the capacitance existing between the metallic element 121, the wall of the reservoir 112 and the ink contained in the reservoir.

The capacitor $Ci_1$ is connected to two resistors $Re_1$ and $Re_2$ in series, representing the equivalent resistance of the ink contained in the reservoir. The resistances $Re_1$ and $Re_2$ have the same value, which is relatively low, since the ink is conductive.

The resistor $Re_2$ is connected to a second capacitor $Ci_2$, which represents the capacitance existing between the ink contained in the reservoir, the wall of the reservoir and the metallic element 122.

A resistor $Re_3$ is connected to the mid-point of the resistors $Re_1$ and $Re_2$, and to a switch SW which represents the presence or absence of ink in the pipe 120, depending on whether the switch SW is closed or open, respectively.

The switch SW is connected to the impedance 123 representing the impedance existing between the ink contained in the print head and earth.

When the excitation signal SE is applied to the metallic element 121, the behaviour of the circuit depends on the quantity of ink present in the reservoir 112 and on the presence or absence of ink in the pipe 120.

In particular, as the quantity of ink in the reservoir decreases, the capacitances $Ci_1$ and $Ci_2$ decrease and the resistances $Re_1$, $Re_2$ and $Re_3$ increase.

In addition, the presence of ink in the pipe 120 corresponds to the closure of the switch SW, and correlatively the absence of ink in the pipe 120 corresponds to the opening of the switch SW.

As long as there remains some ink in the reservoir 112, some of this ink enters the pipe 120, leading to the closure of the switch SW. When there is no more ink in the reservoir 112, the ink also disappears from the pipe 120, which causes the opening of the switch SW.

The first parts $C1_1$ and $C2_1$ of each of the curves C1 and C2 (FIG. 5) correspond to the situation in which the capacitances $Ci_1$ and $Ci_2$ decrease, the resistances $Re_1$, $Re_2$ and $Re_3$ increase and the switch SW is closed.

The second parts $C1_2$ and $C2_2$ of each of the curves C1 and C2 (FIG. 5) correspond to the situation in which the switch SW is open. By detecting the passage from the first to the second part of the curve, it is possible accurately to detect the absence of ink in the reservoir 112.

The opening of the switch SW corresponds in this embodiment to a zero quantity of ink in the reservoir; however, it is possible to design a reservoir where the interruption of the connection of the ink to the predetermined potential corresponds to another quantity of ink.

With reference to FIG. 7, an algorithm according to the invention is stored in the read-only memory 103 of the printing device in order to be implemented by the principal processing means 100. The algorithm includes steps E70 to E84, which are run through periodically, for example before the printing of a document. The algorithm makes it possible to use the electrical signals coming from the circuits 115 in order to determine the quantity of ink present in the ink reservoir 112 and accurately detect a predetermined quantity, here the absence of ink in the reservoir 112.

A first step consists of connecting the ink to the predetermined potential, here earth. In this embodiment, the ink is already connected to earth by means of the ejection circuit.

The step E70 consists of activating the selector 118 in order to enable the excitation signal SE generated by the oscillator 117 to pass to the amplifier 119. The metallic element 121 is then supplied with the excitation signal SE.

The electrical field produced in the ink reservoir 112 by the excitation signal SE is picked up by the metallic element 122 at the following step E71. The metallic element 122 supplies the signal S1 to the conversion circuit 115, which in turn supplies the digital signal SN to the processing circuit 100 at step E72.

The following step E73 is the storage of the value of the signal SN in the register SN of the RAM memory 109.

The step E74 is the deactivation of the selector 118 in order to open the circuit between the oscillator 117 and the metallic element 121, so that the signal SE no longer supplies the metallic element 121.

The step E74 is followed by the step E75, during which the value of the signal SN is compared with the threshold SC1.

If the measured value of the signal SN is greater than the threshold SC1, this means that the measured value is situated in the first part $C1_1$ of the curve C1. The algorithm goes to step E76, during which the quantity of ink ENC in the reservoir 112 is determined. Step E76 consists of seeking, in the mapping table TC or in the register TC of the memory 103, the stored amplitude value which is closest to the measured value S1, and then extracting the corresponding ink quantity value from the mapping table TC.

At step E77, a representation of the extracted ink quantity ENC is displayed on the display 104 for the user. The representation of the quantity of ink is displayed either in numerical form or in the form of a diagram.

As a variant, the value of the ink quantity is transmitted to a remote device, such as a microcomputer, by means of the input/output port 107. The microcomputer then displays a representation of the ink quantity for the user, in numerical form or in diagram form.

If at step E75 the value of the signal SN is below the threshold SC1, this means that the measured value is outside the range P since it is situated either in the first part $C1_1$ of the curve C1 or in the second part $C1_2$ of the curve C1. In order to determine in which part of the curve C1 the measured value is situated, the algorithm goes to step E78, at which the selector 118 is activated in order to enable the excitation signal SEa generated by the oscillator 117a to pass to the amplifier 119. The metallic element 121 is then supplied with the excitation signal SEa.

The following steps E79 to E82 are analogous to steps E71 to E74. The electrical field produced in the ink reservoir 112 by the excitation signal SEa is picked up by the metallic element 122 at the following step E79. The metallic element 122 supplies the signal S1 to the conversion circuit 115, which in turn supplies the digital signal SNa to the processing circuit 100 at step E80.

The following step E81 is the storage of the value of the signal SNa in the RAM memory 109.

Step E82 is the deactivation of the switch 118 in order to open the circuit between the oscillator 117a and the metallic element 121, so that the signal SEa no longer supplies the metallic element 121. The processing circuit 100 then proceeds to the conventional steps of operation of the printer.

The following step E83 is the comparison of the measured value of the signal SNa with the threshold SC2. If the measured value of the signal SN$a$ is below the threshold SC2, this means that the measured value of the signal SN is situated in the first part $C1_1$ of the curve C1.

The algorithm then goes to the step E76 previously described, during which the quantity of ink in the reservoir 112 is determined.

At the following step E77, a representation of the quantity of ink extracted is displayed on the display 104 for the user. The representation of the quantity of ink is displayed either in numerical form or in the form of a diagram.

As a variant, the value of the quantity of ink is transmitted to a remote device, such as a microcomputer, by means of the input/output port 107. The microcomputer then displays a representation of the quantity of ink for the user, in numerical form or in the form of a diagram.

If the measured value of the signal SNa is above the threshold SC2, this means that the measured value of the signal SN is situated in the second part $C1_2$ of the curve C1. There is then almost no more ink in the reservoir 112. The algorithm then goes to step E84 in order to activate an alarm signal which signals the absence of ink in the reservoir. The alarm consists for example of a message displayed on the display 104 for the user.

As a variant, the alarm is transmitted to a remote device, such as a microcomputer, by means of the input/output port 107. The microcomputer then displays an alarm message.

In cases where the invention is applied to a facsimile machine, for example, step E84 can be followed by the storage in memory of the data received so that they can be printed subsequently, or by sending a signal to the remote terminal in order to indicate that the facsimile machine is no longer able to receive data.

The step E75 of comparing the value of the signal SN with the threshold SC1 makes it possible to use the second excitation signal SEa only when the measured value is situated around the minimum of the curve C1.

As a variant, it is possible to use systematically the signal SE and then the signal SEa, for all measurements. Step E75 is then omitted.

In these examples, excellent effects can be obtained particularly in a recording head and a recording apparatus of a system in which a means (for example, an electro-thermal converting element, laser beam, etc.) for generating thermal energy as energy used in discharging an ink is equipped, and the change of state of the ink is caused to take place by the thermal energy, among the ink-jet recording systems. According to such a system, recording high in density and resolution can be achieved.

With respect to its typical structure and principle, it is preferred to employ the basic-principle disclosed in, for example, U.S. Pat. Nos. 4,723,129 and 4,740,796. This system can be applied to both so-called "On-Demand" type and "Continuous" type structures. This system is advantageous to the On-Demand type in particular because an electro-thermal converting element disposed to align to a sheet or a liquid passage in which a liquid (ink) is held is applied with at least one drive signal which corresponds to information to be recorded and which enables the temperature of the electro-thermal converting element to be rapidly raised higher than a nucleate boiling point, so that thermal energy is generated in the electro-thermal converting element and film boiling is caused to take place on the surface of the recording head which is heated. As a result, bubbles can be respectively formed in the liquid (ink) in response to the drive signals. Owing to the enlargement and contraction of the bubbles, the liquid (ink) is discharged through the discharging orifice, so that at least one droplet is formed. In a case where the aforesaid drive signal is made to be a pulse signal, a further satisfactory effect can be obtained in that the bubbles can immediately and properly be enlarged/contracted and the liquid (ink) can be discharged while exhibiting excellent responsibility. It is preferable to use a drive signal of the pulse signal type disclosed in U.S. Pat. Nos. 4,463,359 and 4,345,262. Furthermore, in a case where conditions for determining the temperature rise ratio on the aforesaid heating surface disclosed in U.S. Pat. No. 4,313,124 are adopted, a further excellent recording operation can be performed.

In addition to the structure (a linear liquid passage or a perpendicular liquid passage) of the recording head formed by combining the discharging orifice, the liquid passage and the electro-thermal converting element as disclosed in the aforesaid specifications, a structure disclosed in U.S. Pat. Nos. 4,558,333 and 4,459,600 in which the heated portion is disposed in a bent portion is included in the scope of the present invention.

Furthermore, the present invention can effectively be embodied in a structure in which a common slit is made to be the discharge portion of a plurality of electro-thermal converting elements and which is disclosed in Japanese Patent Application Laid Open No. 59-123670 and a structure in which an opening for absorbing thermal energy pressure waves is defined to align to the discharge part and which is disclosed in Japanese Patent Application Laid-Open No. 59-138461. Namely, according to the present invention, recording operation can be performed surely and effectively irrespective of the form of the recording head.

The present invention may be applied to a full line type recording head having a length which corresponds to the maximum width of the recording medium, which can be recorded by the recording apparatus.

Such a recording head may be either a structure capable of realizing the aforesaid length and formed by combining a plurality of recording heads or a structure formed by an integrally formed recording head.

In addition, the present invention can also be effectively applied to a recording head fixed to the body of the apparatus, a structure having an interchangeable chip type recording head which can be electrically connected to the body of the apparatus or to which an ink can be supplied from the body of the apparatus when it is mounted on the body of the apparatus, or a cartridge type recording head provided with an ink tank integrally formed to the recording head itself among the above-exemplified serial type recording heads.

It is preferable to additionally provide a recording head recovery means and an auxiliary means of the recording apparatus according to the present invention because the effects of the present invention can further be stabilized. Specifically, an effect can be obtained in that the recording operation can be stably performed by providing a recording head capping means, a cleaning means, a pressurizing or sucking means, an electro-thermal converting element or another heating device or an auxiliary heating means formed by combining the aforesaid elements and by performing a preliminary discharge mode in which a discharge is performed individually from the recording operation.

Although the embodiments of this invention, which have been described above, used the liquid inks, inks which are solid at a temperature lower than room temperature, but are softened or liquefied at room temperature may be used. In the aforesaid ink-jet system, the temperature of an ink is usually controlled in a range from 30° C. to 70° C. so as to adjust the viscosity of the ink within a stable discharge range. Therefore, it is only necessary to use inks which are liquefied in response to a record signal applied. Furthermore, inks, the temperature rise of which is prevented by positively using the temperature rise due to the thermal energy as energy of state change from the solid state to the liquid state of ink or inks which are solidified when it is allowed to stand in order to prevent the evaporation of ink may be used. That is, inks which are liquefied by thermal energy applied in response to the record signal and discharged as ink droplets or inks which already begin to solidify when they reach the recording medium may be employed in the present invention. In this case, an ink may be, in the form of liquid or solid, held by a recess of a porous sheet or a through hole as disclosed in Japanese Patent Application Laid-Open No. 54-56847 or 60-71260 and disposed to confront the electro-thermal converting element. It is most preferable for the above-described inks that an ink be discharged by the aforesaid film boiling method.

Furthermore, the ink-jet recording apparatus according to this invention may be in the form, in addition to that used as an image-output terminal for information processing equipment such as a computer, of a copying machine combined with a reader and moreover, of a facsimile terminal equipment having a transmit-receive function or the like.

As has been described above, the present invention can provide ink-jet recording apparatuses, which are cheap and small in size and permit speedy recording of clear and sharp images free from formation of inadequate feathering at boundaries between inks of different colors, without making any changes in constructions of existent apparatuses.

Naturally the present invention is in no way limited to the embodiments described and depicted but, quite the contrary, encompasses any variant within the reach of persons skilled in the art.

What is claimed is:

1. A method for determining a quantity of product present in a reservoir, comprising the steps of:

establishing, through the product present in the reservoir, a first electrical field, and a second electrical field which is differentiated from the first electrical field by at least one characteristic, measuring the first electrical field and the second electrical field passing through the product, to produce a first electrical signal and a second electrical signal respectively representing the first electrical field and the second electrical field, and processing the first electrical signal to produce a first information signal able to take a plurality of values making a representation of the quantity of product then present in the reservoir, determining the quantity of product, in accordance with at least one range of quantities in which said representation is directly usable, and processing the second electrical signal to produce, at an appropriate time, a second information signal representing at least one predetermined quantity outside said range.

2. A method for determining a quantity of product present in a reservoir, comprising the steps of:

connecting the product to a predetermined potential to make a connection of the product to the predetermined potential, establishing, through the product present in the reservoir, a first electrical field, and a second electrical field which is differentiated from the first electrical field by at least one characteristic, measuring the first electrical field and the second electrical field passing through the product, to produce a first electrical signal and a second electrical signal respectively representing the first electrical field and the second electrical field, processing the first electrical signal to produce a first information signal able to take a plurality of values making a representation of the quantity of product then present in the reservoir, determining the quantity of product, in accordance with at least one range of quantities in which said representation is directly usable, and processing the second electrical signal to produce, at an appropriate time, an information signal corresponding to an interruption of the connection of the product to the predetermined potential, the interruption corresponding to a predetermined quantity outside said range.

3. A method according to claim 2, wherein the step of processing the second electrical signal includes a step of comparing the second electrical signal with a second threshold to detect the interruption of the connection of the product to the predetermined potential.

4. A method according to any one of claims 1 to 3, wherein the step of processing the first electrical signal includes a step of detecting an amplitude of the first electrical signal and a step of producing a signal representing the quantity of product from a value given by a calibration table according to the amplitude detected.

5. A method according to claim 4, wherein said method further comprises a step of comparing the first electrical signal with a first threshold to determine whether the quantity of product present in the reservoir is in said range.

6. A method according to claim 4, wherein said method further comprises a step of displaying a representation of the quantity of product present in the reservoir.

7. A method according to claim 4, wherein said method further comprises a step of transmitting the signal representing the quantity of product present in the reservoir to a remote device so that said remote device displays a representation of the quantity of product present in the reservoir.

8. A method according to claim 4, wherein said method further comprises a step of indicating a detection of the predetermined quantity of product present in the reservoir.

9. A method according to claim 4, wherein said method further comprises a step of transmitting a signal representing the detection of said predetermined quantity of product present in the reservoir to a remote device so that said remote device displays a message representing the detection of said predetermined quantity.

10. A method according to any one of claims 1 to 3, wherein said method further comprises a step of comparing the first electrical signal with a first threshold to determine whether the quantity of product present in the reservoir is in said range.

11. A method according to claim 10, wherein said method further comprises a step of displaying a representation of the quantity of product present in the reservoir.

12. A method according to claim 10, wherein said method further comprises a step of transmitting the signal representing the quantity of product present in the reservoir to a remote device so that said remote device displays a representation of the quantity of product present in the reservoir.

13. A method according to claim 10, wherein said method further comprises a step of indicating a detection of the predetermined quantity of product present in the reservoir.

14. A method according to claim 10, wherein said method further comprises a step of transmitting a signal representing the detection of said predetermined quantity of product present in the reservoir to a remote device so that said remote device displays a message representing the detection of said predetermined quantity.

15. A method according to any one of claims 1 to 3, wherein said method further comprises a step of displaying a representation of the quantity of product present in the reservoir.

16. A method according to claim 15, wherein said method further comprises a step of indicating a detection of the predetermined quantity of product present in the reservoir.

17. A method according to claim 15, wherein said method further comprises a step of transmitting a signal representing the detection of said predetermined quantity of product present in the reservoir to a remote device so that said remote device displays a message representing the detection of said predetermined quantity.

18. A method according to any one of claims 1 to 3, wherein said method further comprises a step of transmitting the signal representing the quantity of product present in the reservoir to a remote device so that said remote device displays a representation of the quantity of product present in the reservoir.

19. A method according to claim 18, wherein said method further comprises a step of indicating a detection of the predetermined quantity of product present in the reservoir.

20. A method according to claim 18, wherein said method further comprises a step of transmitting a signal representing the detection of said predetermined quantity of product present in the reservoir to a remote device so that said remote device displays a message representing the detection of said predetermined quantity.

21. A method according to any one of claims 1 to 3, wherein said method further comprises a step of indicating a detection of the predetermined quantity of product present in the reservoir.

22. A method according to any one of claims 1 to 3, wherein said method further comprises a step of transmitting a signal representing the detection of said predetermined quantity of product present in the reservoir to a remote device so that said remote device displays a message representing the detection of said predetermined quantity.

23. A method according to any one of claims 1 to 3, wherein the product is ink.

24. A device for determining a quantity of product present in a reservoir, comprising:
- means for establishing a first electrical field and a second electrical field through the product present in the reservoir, the second electrical field being differentiated from the first electrical field by at least one characteristic,
- means for measuring the first electrical field and the second electrical field to produce a first electrical signal and a second electrical signal respectively representing the first electrical field and the second electrical field, and
- means for processing the first electrical signal and the second electrical signals
  - to produce a first information signal able to take a plurality of values making a representation of the quantity of product present in the reservoir,
  - to determine the quantity of product, in accordance with at least one range of quantities in which said representation is directly usable, and
  - to produce, at an appropriate time, from the second electrical signal, a second information signal representing at least one predetermined quantity outside the range.

25. A device for determining a quantity of product present in a reservoir, comprising:
- means for connecting the product to a predetermined potential to make a connection of the product and the predetermined potential,
- means for establishing a first electrical field and a second electrical field through the product present in the reservoir, the second electrical field being differentiated from the first electrical field by at least one characteristic,
- means for measuring the first electrical field and the second electrical field in order to produce a first electrical signal and a second electrical signal respectively representing the first electrical field and the second electrical field, and
- means for processing the first electrical signal and the second electrical signal
  - to produce a first information signal able to take a plurality of values making a representation of the quantity of product present in the reservoir,
  - to determine the quantity of product, in accordance with at least one range of quantities in which said representation is directly usable, and
  - to produce, at an appropriate time, from the second electrical signal, an information signal corresponding to an interruption of the connection of the product to the predetermined potential, said interruption corresponding to a predetermined quantity outside said range.

26. A device for processing electrical signals, said device cooperating with
- means for establishing a first electrical field through a product present in a reservoir, and adapted to establish a second electrical field, through the product present in the reservoir, the second electrical field being differentiated from the first electrical field by at least one characteristic,
- means for measuring the first electrical field and the second electrical field to produce a first electrical signal and a second electrical signal respectively representing the first electrical field and the second electrical field, said device comprising:
- means for producing a first information signal able to take a plurality of values to make a representation of the quantity of product present in the reservoir,
- means for determining the quantity of product, in accordance with at least one range of quantities in which said representation is directly usable,
- means for producing, at the appropriate time, from the second electrical signal, a second information signal representing at least one predetermined quantity outside said range.

27. A device for processing a first electrical signal and a second electrical signal, said device cooperating with
- means for connecting a product present in a reservoir to a predetermined potential to make a connection of the product to the predetermined potential,
- means for establishing a first electrical field through the product present in the reservoir, and adapted to establish a second electrical field, through the product present in the reservoir, the second electrical field being differentiated from the first electrical field by at least one characteristic,
- means for measuring the first electrical field and the second electrical field in order to produce the first electrical signal and the second electrical signal respectively representing the first electrical field and the second electrical field, said device comprising:
- means for producing a first information signal able to take a plurality of values making a representation of the quantity of product present in the reservoir,
- means for determining the quantity of product, in accordance with at least one range of quantities in which said representation is directly usable, and
- means for producing, at an appropriate time, from the second electrical signal, an information signal corresponding to an interruption of the connection of the product to the predetermined potential, said interruption corresponding to a predetermined quantity outside said range.

28. A device according to any one of claims 24 to 27, wherein the means for establishing includes a first metallic element and a second metallic element disposed outside the reservoir.

29. A device according to claim 28, wherein the first metallic element and the second metallic element form poles of a capacitor whose dielectric is formed by the reservoir containing the product.

30. A device according to claim 29, wherein the means for establishing is fed by oscillators selectively connected thereto by a selector.

31. A device according to claim 29, wherein the first electrical field and the second electrical field are produced by alternating signals with frequencies substantially equal to 1 MHz and 10 kHz respectively.

32. A device according to claim 29, wherein the means for measuring includes an envelope detector and an analogue to digital convertor for producing a digital signal representing an amplitude of the first electrical signal or the second electrical signal.

33. A device according to claim 29, further comprising means for displaying a representation of the quantity of product present in the reservoir.

34. A device for determining a quantity of product in an ink reservoir according to claim 29, wherein said device is included in an image formation device.

35. A device according to claim 28, wherein the means for establishing is fed by oscillators selectively connected thereto by a selector.

36. A device according to claim 28, wherein the first electrical field and the second electrical field are produced by alternating signals with frequencies substantially equal to 1 MHz and 10 kHz respectively.

37. A device according to claim 28, wherein the means for measuring includes an envelope detector and an analogue to digital convertor for producing a digital signal representing an amplitude of the first electrical signal or the second electrical signal.

38. A device according to claim 28, further comprising means for displaying a representation of the quantity of product present in the reservoir.

39. A device for determining a quantity of product in an ink reservoir according to claim 21, wherein said device is included in an image formation device.

40. A device according to any one of claims 24 to 27, wherein the means for establishing is fed by oscillators selectively connected thereto by a selector.

41. A device according to claim 40, wherein the first electrical field and the second electrical field are produced by alternating signals with frequencies substantially equal to 1 MHz and 10 kHz respectively.

42. A device according to claim 40, wherein the means for measuring includes an envelope detector and an analogue to digital convertor for producing a digital signal representing an amplitude of the first electrical signal or the second electrical signal.

43. A device according to claim 40, further comprising means for displaying a representation of the quantity of product present in the reservoir.

44. A device for determining a quantity of product in an ink reservoir according to claim 40, wherein said device is included in an image formation device.

45. A device according to any one of claims 24 to 27, wherein the first electrical field and the second electrical field are produced by alternating signals with frequencies substantially equal to 1 MHz and 10 kHz respectively.

46. A device according to claim 45, wherein the means for measuring includes an envelope detector and an analogue to digital convertor for producing a digital signal representing an amplitude of the first electrical signal or the second electrical signal.

47. A device according to claim 45, further comprising means for displaying a representation of the quantity of product present in the reservoir.

48. A device for determining a quantity of product in an ink reservoir according to claim 45, wherein said device is included in an image formation device.

49. A device according to any one of claims 24 to 27, wherein the means for measuring includes an envelope detector and an analogue to digital convertor for producing a digital signal representing an amplitude of the first electrical signal or the second electrical signal.

50. A device according to claim 49, further comprising means for displaying a representation of the quantity of product present in the reservoir.

51. A device for determining a quantity of product in an ink reservoir according to claim 49, wherein said device is included in an image formation device.

52. A device according to any one of claims 24 to 27, further comprising means for displaying a representation of the quantity of product present in the reservoir.

53. A device for determining a quantity of product in an ink reservoir according to claim 52, wherein said device is included in an image formation device.

54. A device according to any one of claims 24 to 27, wherein the product is ink.

55. A device for determining a quantity of product in an ink reservoir according to claim 54, wherein said device is included in an image formation device.

56. A device for determining a quantity of product in an ink reservoir according to claim 11 or 12, wherein said device is included in an image formation device.

57. A device according to claim 56, wherein the means for connecting the product to the predetermined potential are included in an ink ejection means.

58. A device according to claim 56, wherein said device is included in a printer.

59. A device according to claim 52, wherein said device is included in a facsimile machine.

60. A device according to claim 56, wherein said device is included in a microcomputer.

* * * * *

UNITED STATES PATENT AND TRADEMARK OFFICE
CERTIFICATE OF CORRECTION

PATENT NO. : 6,345,532 B1
DATED : February 12, 2002
INVENTOR(S) : Pascal Coudray et al.

It is certified that error appears in the above-identified patent and that said Letters Patent is hereby corrected as shown below:

Title page,
Item [57], ABSTRACT,
Line 4, "devices" should read -- device --; and
Line 9, "(122)," should read -- (122) --.

Column 4,
Line 39, "advantageous" should read -- advantages --.

Column 5,
Line 53, "FIG.1," should read -- FIG. 1, and --.

Column 7,
Line 35, "generate" should read -- generated --.

Column 12,
Line 32, "SNα" should read -- Sna --.

Column 15,
Line 9, "and" should be deleted.

Column 17,
Line 19, "signals" should read -- signal --; and
Line 67, "characteristic," should read -- characteristic, and --.

Column 18,
Line 10, "usable," should read -- usable, and --; and
Line 25, "characteristic," should read -- characteristic, and --.

UNITED STATES PATENT AND TRADEMARK OFFICE
CERTIFICATE OF CORRECTION

PATENT NO.   : 6,345,532 B1
DATED        : February 12, 2002
INVENTOR(S)  : Pascal Coudray et al.

It is certified that error appears in the above-identified patent and that said Letters Patent is hereby corrected as shown below:

Column 19,
Line 20, "claim 21," should read -- claim 28, --.

Column 20,
Line 39, "claim 52," should read -- claim 56, --.

Signed and Sealed this

First Day of April, 2003

JAMES E. ROGAN
*Director of the United States Patent and Trademark Office*